United States Patent
Sanouillet (10) Patent No.: US 7,703,108 B2
(45) Date of Patent: Apr. 20, 2010

(54) NATIVE CODE ISOLATION IN A MULTI-TASKING JAVA VIRTUAL MACHINE

(75) Inventor: Blaise Sanouillet, St. Albans (GB)

(73) Assignee: Oracle America, Inc., Redwood Shores, CA (US)

( * ) Notice: Subject to any disclaimer, the term of this patent is extended or adjusted under 35 U.S.C. 154(b) by 1344 days.

(21) Appl. No.: 10/493,362

(22) PCT Filed: Oct. 24, 2001

(86) PCT No.: PCT/IB01/01997

§ 371 (c)(1),
(2), (4) Date: Jun. 28, 2004

(87) PCT Pub. No.: WO03/036473

PCT Pub. Date: May 1, 2003

(65) Prior Publication Data

US 2005/0010934 A1    Jan. 13, 2005

(51) Int. Cl.
G06F 3/00      (2006.01)
G06F 9/44      (2006.01)
G06F 9/46      (2006.01)
G06F 13/00     (2006.01)

(52) U.S. Cl. .................................................... 719/331
(58) Field of Classification Search ................. 719/331
See application file for complete search history.

(56) References Cited

U.S. PATENT DOCUMENTS 5,247,681 A * 9/1993 Janis et al. ................... 719/331
5,375,241 A * 12/1994 Walsh ......................... 719/331
5,974,470 A * 10/1999 Hammond .................... 719/331
6,052,778 A * 4/2000 Hagy et al. ..................... 713/2
6,112,025 A * 8/2000 Mulchandani et al. ....... 719/331
6,295,638 B1 * 9/2001 Brown et al. ................. 717/148
6,332,168 B1 * 12/2001 House et al. ................. 719/331
6,363,436 B1 * 3/2002 Hagy et al. .................. 719/331
6,449,618 B1 * 9/2002 Blott et al. ................... 707/101
6,496,831 B1 * 12/2002 Baulier et al. ............... 707/101
6,502,133 B1 * 12/2002 Baulier et al. ............... 709/224

(Continued)

OTHER PUBLICATIONS

Sun Microsystems, Inc. brochure No. XP-002208093, entitled "man pp. 3: Library Routines"; Part No. 805-3175-10, Oct. 1998, pp. 564-583.

(Continued)

Primary Examiner—Hyung S Sough
Assistant Examiner—KimbleAnn Verdi
(74) Attorney, Agent, or Firm—Osha • Liang LLP (57) ABSTRACT

An application program is run in a process supported by an operating system in a computer system. The application program is executed in a virtual machine, and the virtual machine is within the process. Loading a library for the application program includes determining whether this is the first library load instruction in the application program. If it is the first library load instruction, then the library is loaded in a first memory area, and a handle and link map to the first memory area is defined for the library. If the library load instruction is a second or subsequent library load instruction, the further library is loaded in a further memory area, also associated with the link map identifier, and a second handle to the further library is defined and stored.

11 Claims, 5 Drawing Sheets

U.S. PATENT DOCUMENTS

| | | | |
|---|---|---|---|
| 6,542,887 B1 * | 4/2003 | Abbott | 707/2 |
| 6,571,388 B1 * | 5/2003 | Venkatraman et al. | 717/166 |
| 6,606,742 B1 * | 8/2003 | Orton et al. | 717/140 |
| 6,665,671 B2 * | 12/2003 | Coutant | 707/8 |
| 6,681,230 B1 * | 1/2004 | Blott et al. | 707/104.1 |
| 6,684,261 B1 * | 1/2004 | Orton et al. | 719/328 |
| 6,698,015 B1 * | 2/2004 | Moberg et al. | 717/154 |
| 6,708,330 B1 * | 3/2004 | Moberg et al. | 717/158 |
| 6,738,977 B1 * | 5/2004 | Berry et al. | 719/332 |
| 7,143,421 B2 * | 11/2006 | Forin et al. | 719/331 |
| 7,409,694 B2 * | 8/2008 | Forin et al. | 719/331 |
| 7,565,665 B2 * | 7/2009 | Forin et al. | 719/331 |

OTHER PUBLICATIONS

W. W. Ho, et al.; "An Approach to Genuine Dynamic Linking", 8239 Software Practice and Experience, vol. 21, No. 4, Apr. 1991, Chichester, Sussex, Great Britain, pp. 375-390.

D. Balfanz, et al.; "Experience with Secure Multi-Processing in JAVA"; 18th International Conference on Distributed Computing Systems, 1998 Proceeding, Amsterdam, Netherlands, May 26-29, 1998, Los Alamitos, California, USA, IEEE Computer Society, May 26, 1998, pp. 398-405.

Sun Microsystems, Inc. brochure No. XP-002208094, "Linker and Libraries Guide"; Chapter 6, Support Interfaces, Part No. 816-0559-10, Jul. 2001, pp. 143-173.

* cited by examiner

NATIVE CODE ISOLATION IN A MULTI-TASKING JAVA VIRTUAL MACHINE

FIELD OF THE INVENTION

This invention relates to the execution of applications in a multi-tasking environment.

BACKGROUND OF THE INVENTION

In certain fields of application, e.g. the so-called "high-end" servers, there is a need to run a large number of applications, e.g. Java applications, with a good scalability. This in turn implies to ensure: (i) application level isolation, i.e. isolation between the individual Java applications; (ii) native code (e.g. C code) isolation at the level of the hosts, e.g. the JVMs.

In a conventional approach, each application is run via a respective JVM, which is in turn run within a respective process of the operating system. This intrinsically ensures isolation between the various JVMs and applications The above indicated solutions give satisfactory results; however, they suffer drawbacks in terms of resource requirements, especially due to the fact that a number of JVM and/or OS resources have to be duplicated into a respective copy for each of the applications.

A proposal has been made by Greg CZAJKOWSKI, in a paper entitled "Application Isolation in the Java Virtual Machine", Proceedings of ACM, OOPSLA'00, Minneapolis, Minn., October 2000. This proposal tends to execute a plurality of applications in one or each JVM. However, it does not provide native code isolation.

A further proposal has been made by Greg CZAJKOWSKI, Laurent DAYNÈS, and Mario WOLCZKO, in "Automated and Portable Native Code Isolation", Sun Microsystem Technical Note SMLI TR-2001-96, April 2001. This further proposal suggests to execute native code in an operating system process different from that of the "safe language application", e.g. java language. This however induces a performance overhead, when crossing process boundaries. i.e. due to the need to use another process whenever usage of a function written in native code is desired.

Thus, although they give satisfactory results in many cases, the proposals of the prior art may not be adequate in the above indicated context of the "high-end" servers.

SUMMARY OF THE INVENTION

A general aim of the present invention is to bring a solution which is applicable in regular servers, as well as in high end servers.

This invention applies to the loading of a library for an application program, which is run in a process supported by an operating system in a computer system. Responsive to a library load instruction in the application program, the following steps may be performed:

a. determining whether it is the first library load instruction in the application program, b. if it is the first library load instruction, b1. loading the library in a first memory area, and defining a handle for the library, and a memory identifier to the first memory area, and b2. storing the handle and the memory identifier, for use in executing functions contained in the library.

The memory identifier may comprise a link map identifier, designating a link map to the first memory area.

It may happen that a further library load instruction is found. If so, the following additional steps may apply:

c1. loading the further library in a further memory area, also associated to said memory identifier, and defining a further handle to the further library, c2. storing the further handle, for use together with the already stored link map identifier in executing functions contained in the further library.

This invention also addresses a software tool, comprising code for implementing the above steps. It further addresses the software code as used for defining a process (and/or a virtual machine), comprising the said software tool.

Other alternative features and advantages of the invention will appear more clearly when reading the following description of the embodiments of the invention that are given as non-limitative examples.

DETAILED DESCRIPTION

As they may be cited in this specification, Sun, Sun Microsystems, SOLARIS, JAVA, EmbeddedJava, PersonalJava, JavaBeans, Java Naming and Directory Interface, JDBC (Java Data Base Connectivity), Enterprise JavaBeans, Jini, Java Workshop, BeanBox, and Sun Spontaneous Management are trademarks of Sun Microsystems, Inc. SPARC is a trademark of SPARC International, Inc.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright and/or author's rights whatsoever.

Additionally, the detailed description is supplemented with the following Exhibits:

Exhibit E1 shows examples of code.

In the foregoing description, references to the Exhibits are made directly by the Exhibit or Exhibit section identifier: for example, E1-1 refers in fact to section E.1-1 in Exhibit E1. The Exhibits are placed apart for the purpose of clarifying the detailed description, and of enabling easier reference. They nevertheless form an integral part of the description of the present invention. This applies to the drawings as well.

Now, making reference to software entities imposes certain conventions in notation. For example, in the detailed description, Italics (or the quote sign ") may be used when deemed necessary for clarity. However, where code is being considered:

quote signs are used only when required in accordance with the rules of writing code, i.e. for string values.

a name followed with ☐ indicates an array.

also, <attribute> may be used to designate a value for the attribute named "attribute" (or attribute).

finally, code sections may have a left column containing identifiers for easy reference. The identifiers form no part of the code.

This invention may be implemented in a computer system, or in a network comprising computer systems. The hardware of such a computer system is for example as shown in FIG. 1, where:

11 is a processor, e.g. an Ultra-Sparc;
12 is a program memory, e.g. an EPROM for BIOS;
13 is a working memory, e.g. a RAM of any suitable technology (SDRAM for example);
14 is a mass memory, e.g. one or more hard disks;
15 is a display, e.g. a monitor;
16 is a user input device, e.g. a keyboard and/or mouse; and
21 is a network interface device connected to a communication medium 20, itself in communication with other computers. Network interface device 21 may be an Ethernet device, a serial line device, or an ATM device, inter alia. Medium 20 may be based on wire cables, fiber optics, or radio-communications, for example.

Figure 1:
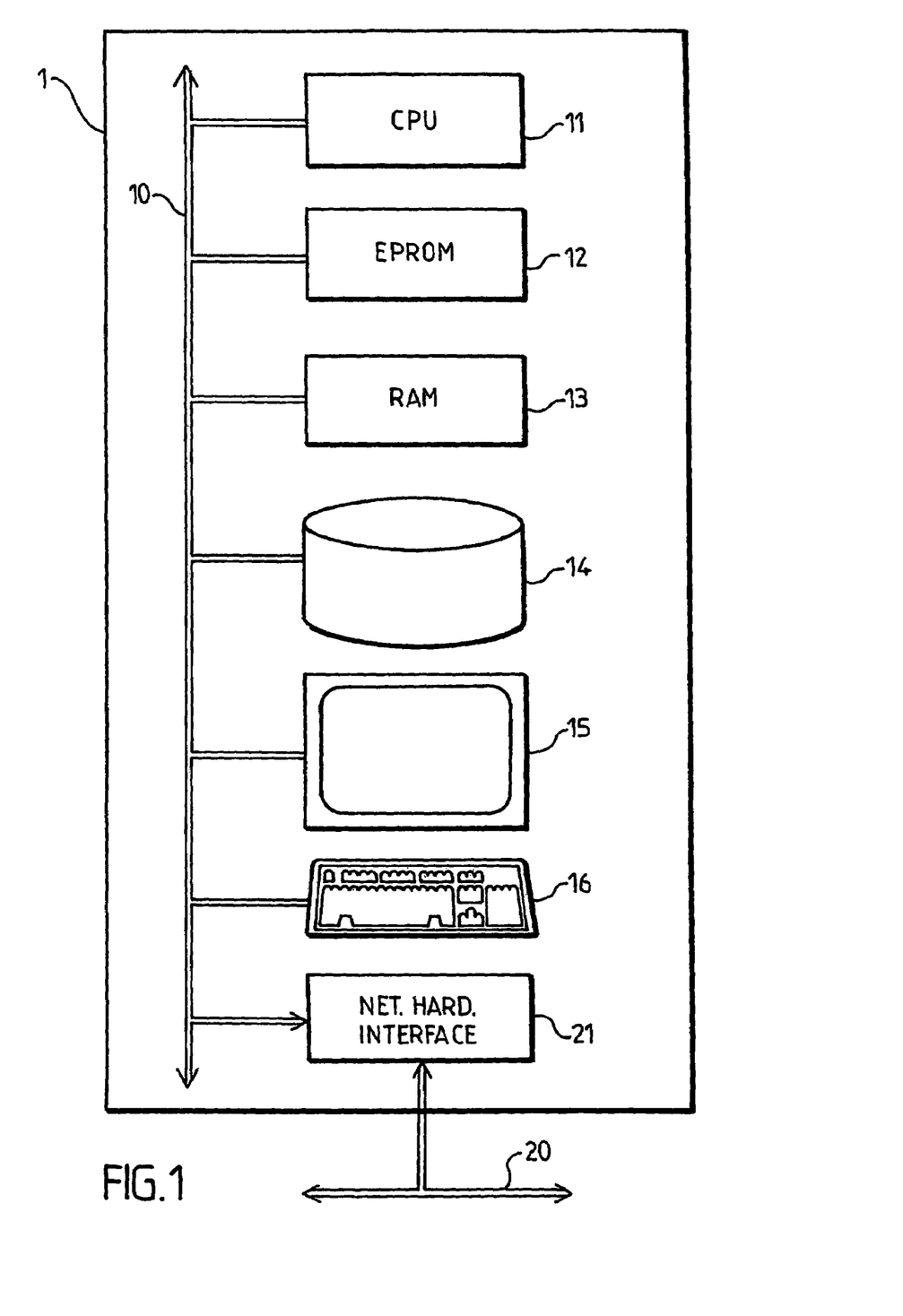
FIG. 1 is a general diagram of a computer system in which the invention is applicable.

Data may be exchanged between the components of FIG. 1 through a bus system 10, schematically shown as a single bus for simplification of the drawing. As is known, bus systems may often include a processor bus, e.g. of the PCI type, connected via appropriate bridges to e.g. an ISA bus and/or an SCSI bus.

FIG. 1 is exemplary only. Computer stations in which this invention is applicable may comprise only part of the components of FIG. 1: some stations may have no user interface and/or no hard disk, for example.

Figure 2:
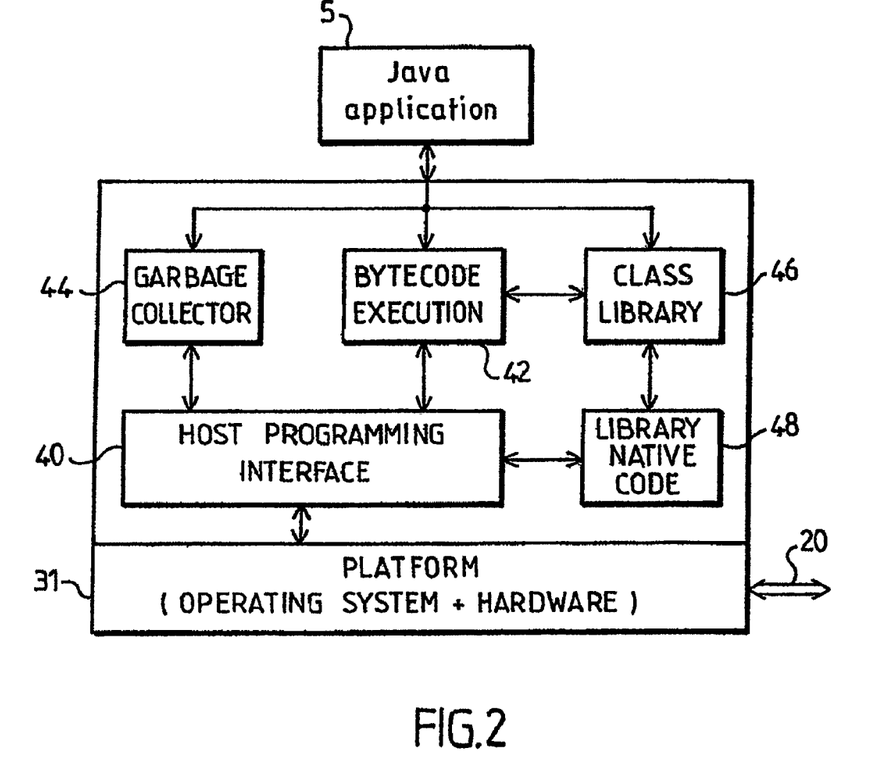
FIG. 2 is a functional diagram of a platform hosting a Java virtual machine.

The general structure of an exemplary Java Virtual Machine is shown in FIG. 2. The platform 31 comprises the hardware 1 of FIG. 1 and operating system 3 of FIG. 3, together with network connection 20 of FIG. 1. To support Java application 5, the Java Virtual Machine 4 has a host programming interface or HPI 40, a bytecode execution module 42, a garbage collector (GC) 44, a class library 46, and a library native code module 48. The bytecode execution module 42 may be e.g. a bytecode interpreter, or a just-in-time compiler, as known.

The reader is assumed to be familiar with object oriented programming in general, more specifically with JAVA. Details may be found in printed documentation, e.g. "The Java Language Specification", J. GOSLING, Bill Joy, Guy STEELE, Addison Wesley, 1996, ISBN 0-201-63451-1.

In object oriented programming, an object may comprise properties (or "fields") and methods, together termed [object] members. For convenience, the methods are usually identified by their name followed with ( ). Where a method requires parameters, these are inserted between the two round brackets. Most of the methods are directed to the members or internal contents of the object: get( ) for reading a property, set( ) for writing a property, other property-related methods, access to other methods, etc . . . .

A method contained in an object may be inter alia public or private; this determines whether it is accessible (may be invoked) from outside the object, or not. Object members may also be static or transient.

A method is "native", when it is programmed in "native code", i.e. a code closer to the machine, e.g. non Java code like C, binary code or assembler.

Object oriented programming also uses "classes", which may serve the following purposes:

objects may be "instantiated" from a class, using an object constructor (in short, a constructor); in JAVA, a constructor is a method having the same name as the class it belongs to.

a class may "extend" a parent class, thus inheriting the properties and methods of the parent class.

Using native code or native methods may be interesting in terms of performance. However, care should be taken that their use:

i.—fully enforces the features of the platform, e.g. isolation between separate application;

ii.—is seen from the user as if it was a method in the high level language, e.g. JAVA.

Figure 3:
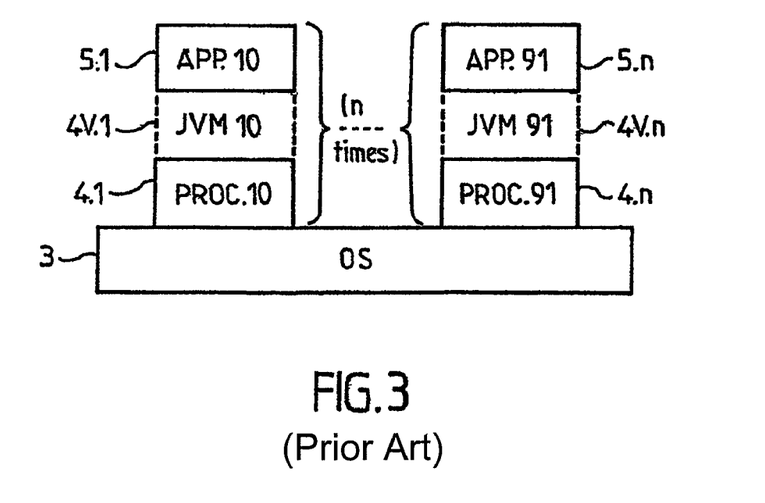
FIG. 3 is a conventional arrangement supporting a plurality of applications in mutual isolation.

FIG. 3 shows the conventional approach. The operating system 3 supports a plurality of processes 4.1 through 4.$n$, which respectively support applications 5.1 through 5.$n$, via respective virtual machines 4V.1 through 4V.$n$. (The virtual machines are shown in dashed lines, since each application might be directly supported by its process as well). FIG. 3 is simplified to two applications APP.10 and APP.91. In such a case, each native code method called by an application must be individually supported in the process for that application.

Figure 4:
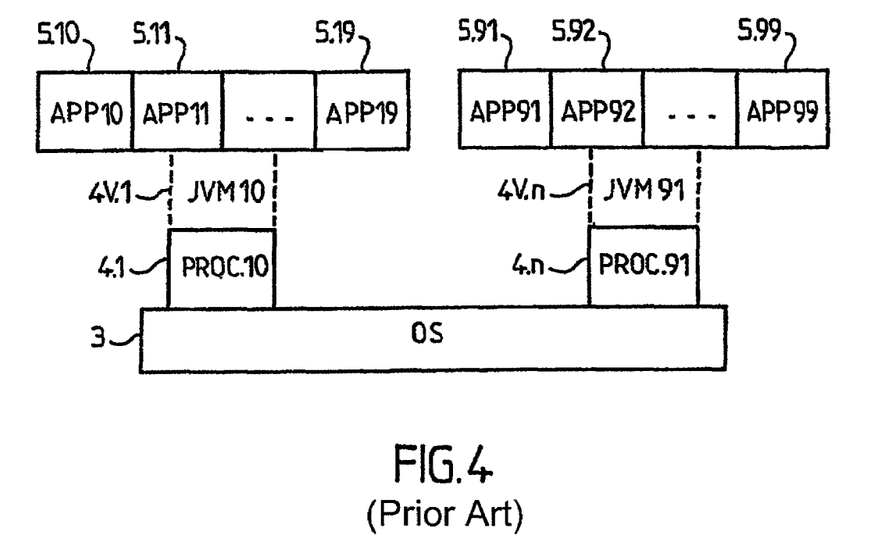
FIG. 4 is a second known proposal for supporting a plurality of applications in mutual isolation.

FIG. 4 shows the first mentioned proposal of Greg CZAJKOWSKI. Each process and JVM may support several applications: for example process PROC.10 (4.1.) and the JVM.10 (4.V1) support applications APP.10 through APP.19 (or 5.10 through 5.19), and PROC.91 (4.$n$) and the JVM 91 (4V.n) support applications APP.91 through APP.99 (reference numbers 5.91, 5.92 . . . 5.99. However, this does not inherently provide native code isolation between the applications; for obtaining native code isolation, the native code must be rewritten to be rendered multi-tasking, which necessitates an important amount of programming. Also, additional resources would be required to support multi-task operation.

For example, the native code may have to use "global" variables, which have to be shared by all calls of the library from a given application, but should not be shared by calls coming from another application. In this example, the library should be rewritten such that it can manipulate a respective copy of the global variables for each application. Other similar problems may exist. Those skilled in the art will understand that such rewriting involves an in-depth analysis of the library to be rewritten.

Figure 5:
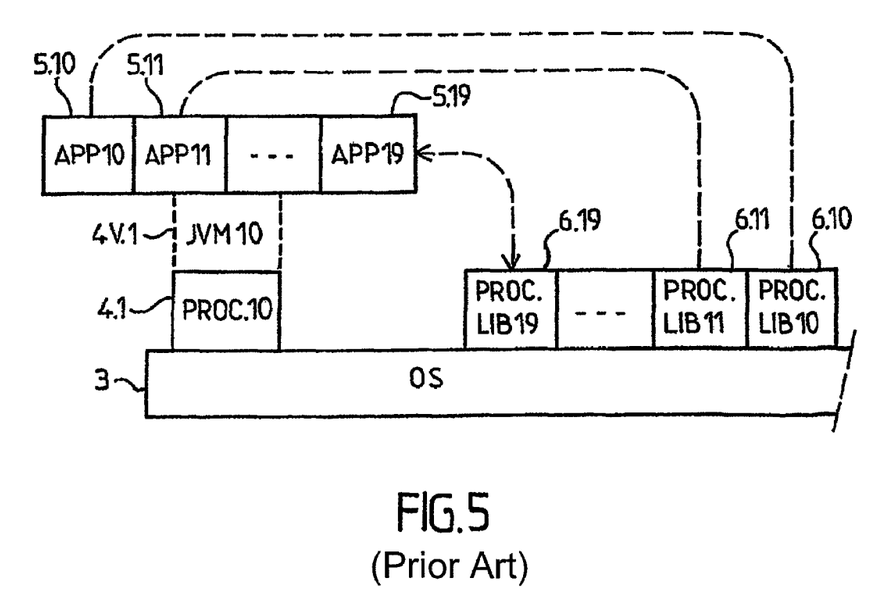
FIG. 5 is another known proposal for supporting a plurality of applications in mutual isolation, at the level of native code execution.

In accordance with the second proposal of Greg CZAJKOWSKI et al, one or more special processes are dedicated to the implementation of the native code. This is shown in FIG. 5, which is restricted to the left portion of FIG. 4: independent processes PROC_LIB10 through PROC_LIB19 (shown as 6.10-6.19) implement native code for applications APP10 through APP19 (or 5.10-5.19), respectively, as shown by dashed links which are purely illustrative. As noted, this has drawbacks and limitations, due to the need to revert to a different process, and also in terms of necessary resources.

Now, this invention may apply within one or more machines, having e.g. the exemplary structure of FIG. 1, or any similar structure. Each computer system also has an operating system 3, e.g. SOLARIS. Operating systems other than SOLARIS may be used in accordance with the invention.

As noted, each JVM may be run within a respective process of the operating system. This intrinsically ensures isolation between the various JVMs. Besides, communication between the JVMs, and between the applications they host, may be made using fast Inter Process Communication mechanisms (IPC), as available in Unix-like operating systems, e.g. the SOLARIS operating system of the applicant company, and/or the Remote Method Invocation, for the JVMs/java applications themselves.

As also already noted, the above indicated solutions give satisfactory results; however, they suffer drawbacks in terms of resource requirements, especially due to the fact that a number of such resources (e.g. memory) have to be duplicated into a respective copy for each of the JVMs. This applies in particular to the calls to library native code, e.g. C language code. Such library code is available through the host programming interface 31, and must be used, with isolation, by each of the java virtual machines and/or end applications. In fact, it requires individualized resources for each JVM and/or application.

Generally, the problem is to enable a given process to issue several calls to a common library code, with such calls being rendered fully isolated from each other whenever desired.

A typical call to a library Lib1, containing a function Lib1Func1 is shown in E1.1. The sequence is as follows:
  at A1, a first instruction declares the function Lib1Func1, as using native code;
  at A2, a second instruction loads the library Lib1;
  at A3, a third instruction calls function Lib1Func1.

This may be repeated one or more times, with other functions and libraries; however, there is a tendency to have all native code for a given application in a single library.

Declaring the function at A1 is optional, and may not be used in certain programming languages.

In the prior art, the second instruction A2 acts as follows:
  in the case of FIG. 3, load the library file in a new memory area, which is handled by the process hosting the application; isolation is inherent, since there is one process per application, as shown in E.1.2.
  in the case of FIG. 4, load a single multi-user library file in a new memory area, which is again handled by the process hosting the application. Isolation may be obtained by rewriting the native code in multi-user form, if possible, as shown in E.1.3. Alternatively, one may rewrite the library in the application language, e.g. JAVA. However, none of these solutions can fit all needs, especially because native code may still be needed in heavy duty machines, like "high end" servers.
  in the ease of FIG. 5, call a special process, e.g. PROC-LIB10 or PROC-LIB11, as shown in E.1.4.

This invention is based on a different approach, which in turn is based on certain observations relating to existing tools in Unix-like operating systems. These observations will be described hereinafter with reference to the applicant company's SOLARIS operating system; however, they may apply to other operating systems as well.

It has been observed that, amongst its debugging oriented instructions, SOLARIS has a dlmopen( ) instruction (in fact a "library call", in Unix terminology), which may be used to make a library available to a process run in the SOLARIS operating system. As it will be seen later on in this specification, dlmopen( ) has companion instructions (or calls), comprising dlinfo( ), and dlsym( ).

It has been discovered that this dlmopen( ) instruction and its companions are of significant help in solving the problem underlying this invention.

This will now be described with reference to FIG. 6.

Figure 6:
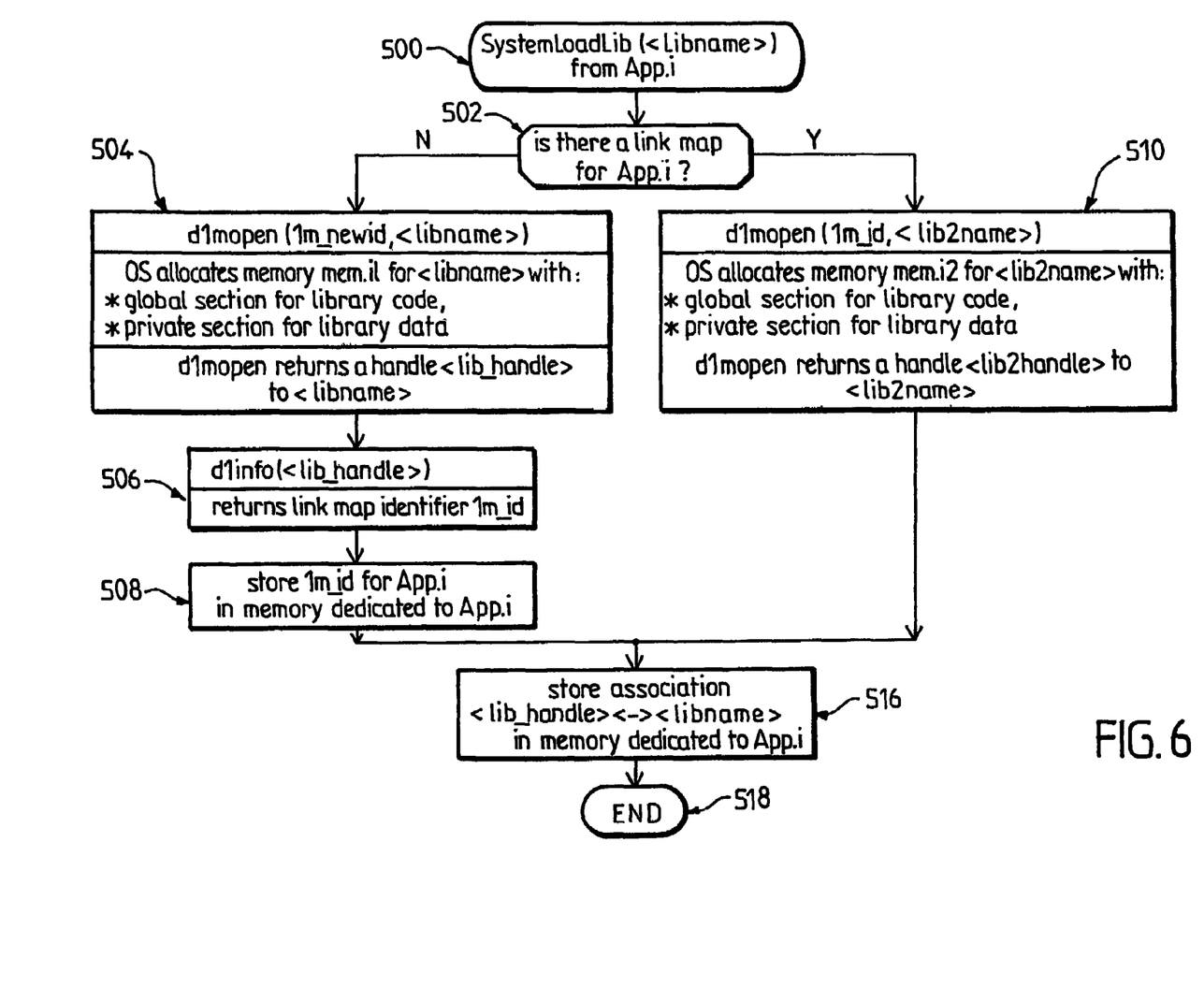
FIG. 6 is a flow-chart of an exemplary native library load in accordance with this invention.

The starting point of FIG. 6 (operation 500) is triggered by application code like the second instruction A2 in E.1.1, i.e. a SystemLoadLib( ) instruction calling a library <Libname> (with libname="lib1" in the example E.1.1).

Operation 502 firstly determines if this is the first library load instruction in the currently running application App.i.

If operation 502 determines that this is the first library load instruction, then control is given to operation 504, which issues (in the case of SOLARIS) a dlmopen( ) instruction having the form given within the frame of operation 504 in FIG. 6. An lm_newid identifier is passed as a first parameter to dlmopen( ), followed by the <libname> as a second parameter.

The response of the operating system is to allocate memory mem.i for the library <libname> being passed as parameter. The library is given a global memory section for library code, and a private section for library data. (In this regard, "library code" designates the fixed portion of the code, e.g. commands in the native language, while "library data" designates the variable portion of the code, e.g. variables, including the above mentioned global variables.)

The global memory section is shared for all processes (and virtual machines) which may exist currently under control of the operating system. The private section is dedicated to a particular process and therefore to a particular virtual machine.

The return of dlmopen( ) is a handle <lib_handle>, which will thereafter enable the program to access the library <libname>, through e.g. its link map. As known, a link map may be viewed as a structure or list, maintained by a link editor, to keep track of all shared objects loaded in the address space of a process. Such structures are used at run-time, and do not appear within the text or data segment of an executable or shared library. The use of dlmopen( ) makes it possible to reduce the scope of a link map to an application, rather than to the process hosting that application.

Immediately or later, the process or JVM will issue a dlinfo( ), as shown at operation 506. The parameter of the dlinfo( ) is the <lib_handle>. The dlinfo( ) returns a link map identifier lm_id.

Thereafter, operation 508 stores the lm_id for the application app.i (in fact in the process hosting that application). The storage is of course effected in a memory area dedicated to the application app.i, in the process and JVM.

Whether or not operation 506 and 508 are made immediately, operation 504 is followed by operation 516, which will store an association <lib_handle>, <libname> in the memory area dedicated to the application app.i in the process and JVM. The process ends at 518.

If test operation 502 has determined that another SystemLoadLib( ) instruction has already been issued, then control is given to operation 510, which will use the lm_id as a first parameter. Those skilled in the art will now appreciate that, while operations 506 and 508 may be performed immediately after operation 504, they may also be performed immediately before operation 510 is performed (or, at least, immediately before operation 510 is performed for the first time).

At operation 510, dlmopen( ) is now performed with the above mentioned lm_id as a first parameter, and a second parameter <lib2name>, which is the name of another library to be loaded. In response, the operating system will allocate memory for library <lib2name> with again a global section for function code, and a private section for function results. dlmopen( ) also returns another handle <lib2handle>, which enables access to <lib2name>.

Operation 510 may be repeated each time a further library is to be loaded, after the first library load.

E.1.5 shows the results of t the above operations for two applications app.i and app.j. A larger number of applications may be handled, if desired.

In more detail, the test of operation 502 may be viewed as determining whether there is already a link map for the application app.i. As described in connection with operation 516, if there is already an association <lm_id>, <app_i>, then this is not the first library load instruction.

After a library has been loaded, the functions it contains can be made accessible, as it will now be described with reference to the example of FIG. 7.

Figure 7:
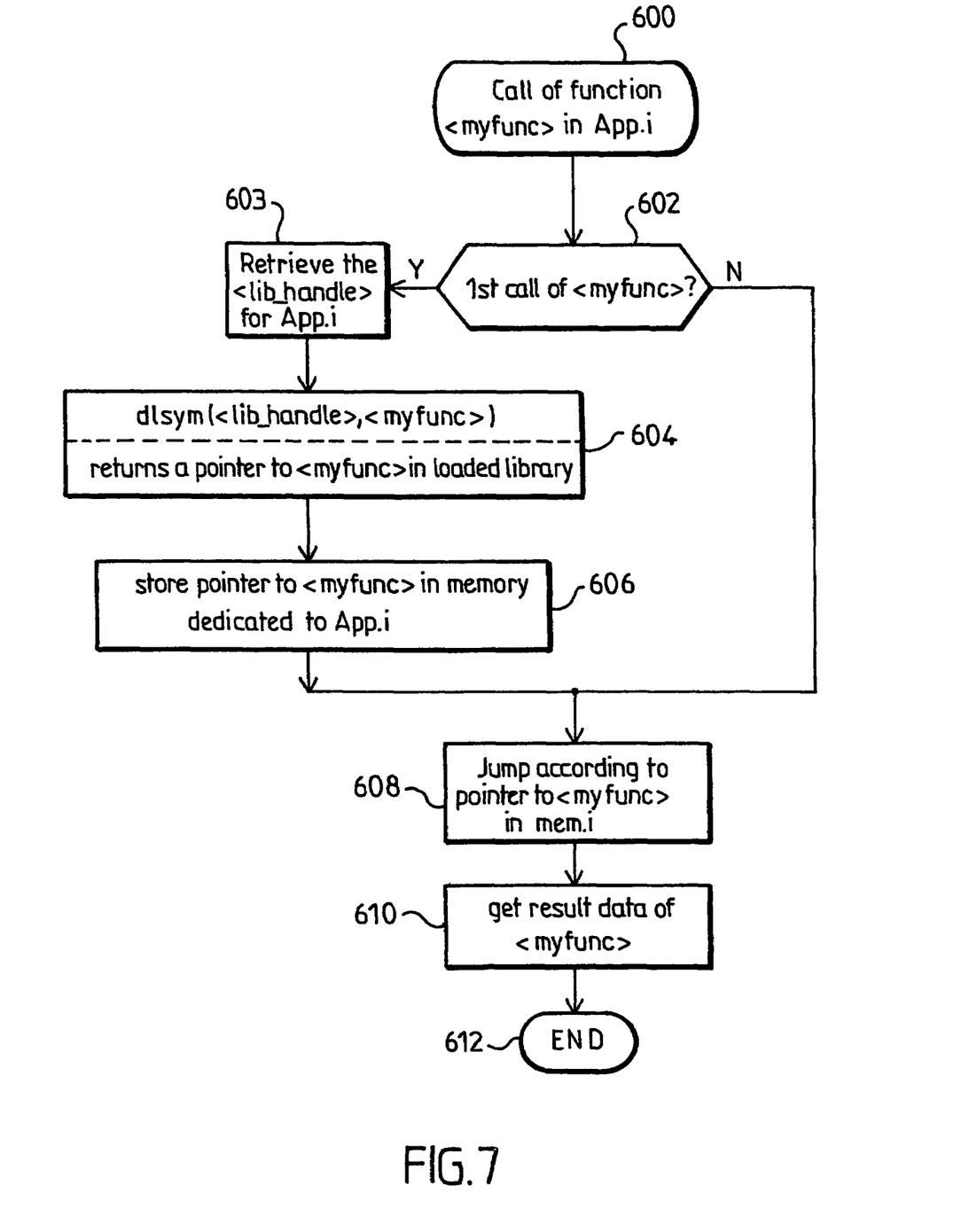
FIG. 7 is a flow-chart of an exemplary native function (or method) call in accordance with this invention.

The first operation of FIG. 7, operation 600, is a call of the function <myfunc>, which may be for example the Lib1func1( ), which appears as a third instruction A3 in E.1.1, for an application App.i.

Operation 602 determines whether this is the first call of <myfunc>. If so, operation 603 retrieves the <lib_handle> for App.i, and the library <libname> which contains <myfunc>, as stored e.g. at operation 516 of FIG. 6. Then, operation 604 will issue a dlsym( ) instruction, having <lib_handle> as a first parameter, while the second parameter is the function <myfunc> being called. The dlsym( ) instruction returns a pointer <mypointer> to the location where <myfinc> is.

Operation 606 now stores the pointer <mypointer> to <myfunc> in the memory dedicated to the application app.i.

Operation 608 will now jump according to the pointer to the location of <myfunc>, and, at 610, get the results of <myfunc>, after which the end is reached at 612.

In case test operation 602 detects that this is not the first call of <myfinc>, then the algorithm may skip directly to operation 608.

In more general terms, the method of FIG. 7 may be summed up as follows:
responsive to a first instruction calling a given function in a library loaded from the process,
  i. calling a symbol table processing function (e.g. dlsym( )) of the OS from the process, with the handle as a parameter, to get a pointer to the given function within the link map,
  ii. storing the pointer in a memory area of the process, and
  iii. jumping to the location indicated by the pointer to execute the given function.

If the application has several calls of the function, then:
responsive to another instruction calling the given function in the library from the process, directly jumping to the location indicated by the corresponding pointer to execute the given function.

Using a mechanism as described with reference to FIGS. 6 and 7, makes it possible to perform the required isolation between each virtual machine operating in each of many processes, hosted by the platform of FIG. 4.

This invention specifically applies to library native code, as may be used in virtual machines, e.g. Java virtual machines. However, it is not limited to this case, and may be used in other similar circumstances as well, e.g. with code which would not exactly qualify as "native code".

This invention makes native code isolation possible where a plurality of applications are hosted in the same process, optionally, via one or more virtual machines. In the case of Java virtual machines, the code of FIG. 6 or 7 is executed in the Java virtual machine.

In general, this invention may be used in connection with any language that enables some control on function calls, or that can be arranged to enable such a control.

Although this may raise other problems, this invention may also be used to host several virtual machines in the same process, e.g. several Java virtual machine in the same process.

One of the major advantages of this invention is that it avoids completely duplicating a number of resources (mainly, memory) for each virtual machine or process.

The code section of e.g. the libraries may be shared between all processes or virtual machines; only the library data section of each function may have to be duplicated, and, in fact, only for the time interval within which the library data need to be made available.

Those skilled in the art will appreciate that, in certain circumstances, conflicting accesses to the code section of a library might exist. These conflicts of access may be solved using known techniques. In fact the access conflict will, in the case of dlmopen( ), be encountered with certain system interfaces, which exist assuming, they are the only instance of their implementation within a process. In SOLARIS, this applies for example to threads, signals and memory allocation. This is only an effect of dlmopen( ); in fact, the above mentioned system interfaces may be wrapped with application specific processing entities, which are arranged to avoid the above mentioned access conflicts.

This invention also covers the software code as used in this invention, especially when made available on any appropriate computer-readable medium. The expression "computer-readable medium" includes a tangible storage medium such as magnetic or optic.

The software code basically includes, as a software tool, the code as used for execution of a method as exemplified in FIG. 6 and/or 7, or a similar method. Such code may be incorporated within software code for defining a process, which in turn may be incorporated within an operating system. Alternatively, as exemplified above, the code may use existing and/or adapted OS functions, like dlmopen( ) and its companion instructions. However, this invention is in no way restricted to the syntax as described in connection with dlmopen( ) and its companion instructions. Where virtual machines are used, the software tool may be at least partially comprised within the virtual machine code.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

| Exhibit E1 | | |
| --- | --- | --- |
| E.1.1 | | |
| A1 | Public native Lib1Func1( ); | |
| | ... | |
| A2 | SystemLoadLib("Lib1"); | |
| | ... | |
| A3 | Lib1Func1( ); | |
| | ... | |
| E.1.2 | | |
| | App.10 in JVM.10 | APP.91 in JVM.91 |
| SystemLoadLib ("Lib1") | uses "mem10" in JVM10 | uses "mem91" in JVM91 |
| E.1.3 | | |
| | App.10 in JVM.10 | App.11 in JVM.10 |
| SystemLoadLib ("Lib1") | requires "Lib1" rewritten to accommodate multi-user operation, and larger memory | |
| E.1.4 | | |
| | App.10 in JVM.10 | App.11 in JVM.10 |
| SystemLoadLib ("Lib1") | revert to separate process PROC_LIB10 for native code | revert to separate process PROC_LIB11 for native code |
| E.1.5 | | |
| * App.i | lm_id.i | libhandle.i lib2handle.i |
| * App.j | lm_id.j | libhandle.j lib2handle.j |

The invention claimed is:

1. A method of loading a library for an application program, the application program being run in a process supported by an operating system (OS) in a computer system, the method comprising the following steps, responsive to a library load instruction in the application program:
   (a) determining whether it is the first library load instruction in the application program, wherein the application program is executed in a virtual machine, and wherein the virtual machine is within the process,
   (b) if the library load instruction is the first library load instruction,
   (b1) loading the library in a first memory area, creating a link map to the first memory area, and defining a handle for the library and a link map identifier for the link map to the first memory area,
   (b2) storing the handle and the link map identifier, wherein the handle and the link map identifier are stored in a memory area dedicated to the application program and accessible only by the virtual machine,
   (c) if the library load instruction is a further library load instruction,
   (c1) loading the further library in a further memory area, also associated to said link map identifier, and defining a further handle to the further library,
   (c2) storing the further handle in the memory area dedicated to the application program, and
   (d) responsive to a first instruction calling a given function in the library loaded from the process,
   (d1) calling a symbol table processing function of the OS from the process, with the handle as a parameter, to get a pointer to the given function within the link
   (d2) storing the pointer in the memory area dedicated to the application program, and
   (d3) jumping to the location indicated by the pointer to execute the given function.

2. The method of claim 1, wherein step (b1) comprises calling a library load function of the operating system from the process.

3. The method of claim 1, wherein step (b2) comprises calling a link map identifier returning function of the operating system from the process.

4. The method of claim 1, wherein step (c1) comprises updating the link map to include the further memory area, wherein the link map is a link to the first memory area.

5. The method of claim 1, further comprising the step of:
   (e) responsive to another instruction calling the given function in the library from the process, directly jumping to the location indicated by the corresponding pointer to execute the given function.

6. The method of claim 1, wherein the virtual machine is a Java™ virtual machine.

7. A computer readable storage medium, embodying instructions executable by the computer to perform method steps for loading a library for an application program, the application program being run in a process supported by an operating system (OS) in a computer system, the instructions comprising functionality to, responsive to a library load instruction in the application program:
   (a) determine whether it is the first library load instruction in the application program, wherein the application program is executed in a virtual machine, and wherein the virtual machine is within the process,
   (b) if the library load instruction is the first library load instruction,
   (b1) load the library in a first memory area, create a link map to the first memory area, and define a handle for the library and a link map identifier to the first memory area, and
   (b2) store the handle and the link map identifier, wherein the handle and the link map identifier are stored in a memory area dedicated to the application program and accessible only by the virtual machine,
   (c) if the library load instruction is a further library load instruction,
   (c1) load the further library in a further memory area, also associated to said link map identifier, and defining a further handle to the further library,
   (c2) store the further handle in the memory area dedicated to the application program, and
   (d) responsive to a first instruction calling a given function in a library loaded from the process,
   (d1) call a symbol table processing function of the OS from the process, with the handle as a parameter, to get a pointer to the given function within the link map,
   (d2) store the pointer in the memory area dedicated to the application program, and
   (d3) jump to the location indicated by the pointer to execute the given function.

8. The computer readable storage medium of claim 7, wherein step (b1) comprises calling a library load function of the operating system from the process.

9. The computer readable storage medium of claim 7, wherein step (b2) comprises calling a link map identifier returning function of the operating system from the process.

10. The computer readable storage medium of claim 7, wherein step (c1) comprises updating the link map to include the further memory area, wherein the link map is a link to the first memory area.

11. The computer readable storage medium of claim 7, the instructions further comprising functionality to:
   (e) responsive to another instruction calling the given function in the library from the process, directly jump to the location indicated by the corresponding pointer to execute the given function.

* * * * *

UNITED STATES PATENT AND TRADEMARK OFFICE
CERTIFICATE OF CORRECTION

| | | |
|---|---|---|
| PATENT NO. | : 7,703,108 B2 | Page 1 of 1 |
| APPLICATION NO. | : 10/493362 | |
| DATED | : April 20, 2010 | |
| INVENTOR(S) | : Blaise Sanouillet | |

It is certified that error appears in the above-identified patent and that said Letters Patent is hereby corrected as shown below:

In column 4, line 31, delete "5.99" and insert -- 5.99) --, therefor.

In column 5, line 40, delete "ease" and insert -- case --, therefor.

In column 7, line 11, delete "<myfinc>" and insert -- <myfunc> --, therefor.

In column 7, line 18, delete "<myfinc>," and insert -- <myfunc>, --, therefor.

In column 7, line 67, delete "fact" and insert -- fact, --, therefor.

Signed and Sealed this
Twenty-fourth Day of May, 2011

David J. Kappos
*Director of the United States Patent and Trademark Office*